(12) United States Patent
Wade et al.

(10) Patent No.: US 8,990,526 B2
(45) Date of Patent: Mar. 24, 2015

(54) MERGING DATA VOLUMES AND DERIVATIVE VERSIONS OF THE DATA VOLUMES

(75) Inventors: Gregory L. Wade, San Jose, CA (US); J. Mitchell Haile, Somerville, MA (US)

(73) Assignee: Quantum Corporation, San Jose, CA (US)

( * ) Notice: Subject to any disclaimer, the term of this patent is extended or adjusted under 35 U.S.C. 154(b) by 578 days.

(21) Appl. No.: 13/267,529

(22) Filed: Oct. 6, 2011

(65) Prior Publication Data

US 2012/0117343 A1 May 10, 2012

Related U.S. Application Data

(60) Provisional application No. 61/390,184, filed on Oct. 6, 2010.

(51) Int. Cl.
*G06F 13/00* (2006.01)
*G06F 3/06* (2006.01)

(52) U.S. Cl.
CPC .............. *G06F 3/061* (2013.01); *G06F 3/0643* (2013.01); *G06F 3/065* (2013.01); *G06F 3/0671* (2013.01)
USPC ........... 711/161; 711/165; 711/166; 707/616; 707/638; 707/639; 707/641; 707/695; 707/797

(58) Field of Classification Search
CPC . G06F 3/0646; G06F 3/0655; G06F 11/1448; G06F 11/1469; G06F 12/0223; G06F 12/0638
USPC .......... 711/161, 165, 166; 707/616, 638, 639, 707/641, 695, 797
See application file for complete search history.

(56) References Cited

U.S. PATENT DOCUMENTS

| | | | | |
|---|---|---|---|---|
| 5,819,292 | A  * | 10/1998 | Hitz et al. | 1/1 |
| 6,813,522 | B1 * | 11/2004 | Schwarm et al. | 700/5 |
| 7,111,014 | B2 * | 9/2006 | Sawdon et al. | 1/1 |
| 7,334,095 | B1 * | 2/2008 | Fair et al. | 711/161 |
| 7,437,360 | B1 * | 10/2008 | Chitre et al. | 1/1 |
| 7,444,361 | B2 * | 10/2008 | Kahn et al. | 1/1 |
| 7,577,647 | B2 * | 8/2009 | Graefe et al. | 1/1 |
| 7,590,633 | B1 * | 9/2009 | Manley et al. | 1/1 |
| 8,020,037 | B1 * | 9/2011 | Schwartz et al. | 714/6.3 |
| 2002/0083037 | A1 * | 6/2002 | Lewis et al. | 707/1 |
| 2006/0168409 | A1 * | 7/2006 | Kahn et al. | 711/161 |
| 2007/0022264 | A1 * | 1/2007 | Bromling et al. | 711/162 |
| 2008/0126437 | A1 * | 5/2008 | Chiba | 707/201 |
| 2010/0034202 | A1 * | 2/2010 | Lu et al. | 370/392 |
| 2010/0153617 | A1 * | 6/2010 | Miroshnichenko et al. | 711/6 |

* cited by examiner

*Primary Examiner* — Reba I Elmore

(57) ABSTRACT

Responsive to an instruction to collapse a derivative version of an ancestor data volume into the ancestor data volume, it is determined if a characteristic of the derivative version of the ancestor data volume satisfies a criteria relative to a characteristic of the ancestor data volume. If the characteristic of the derivative version satisfies the criteria, the ancestor data volume is merged into the derivative version of the underlying data to form an updated derivative version. The updated derivative version is established as the ancestor data volume.

20 Claims, 5 Drawing Sheets

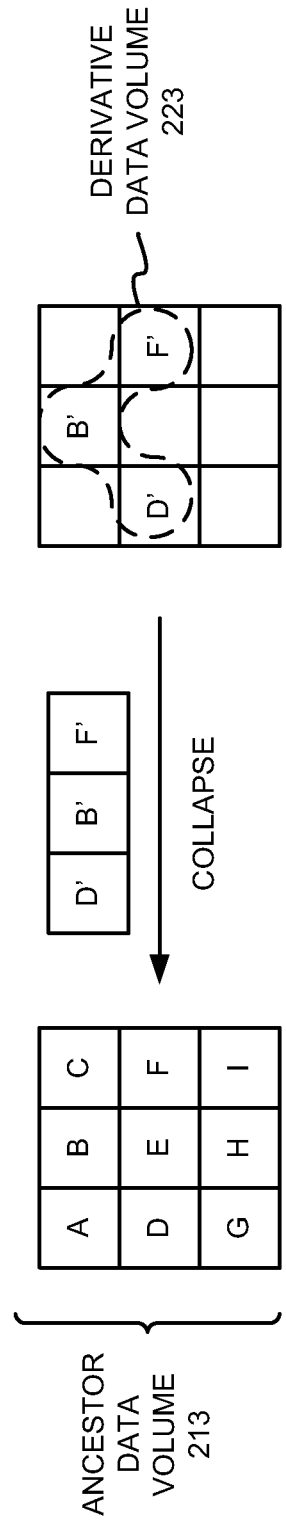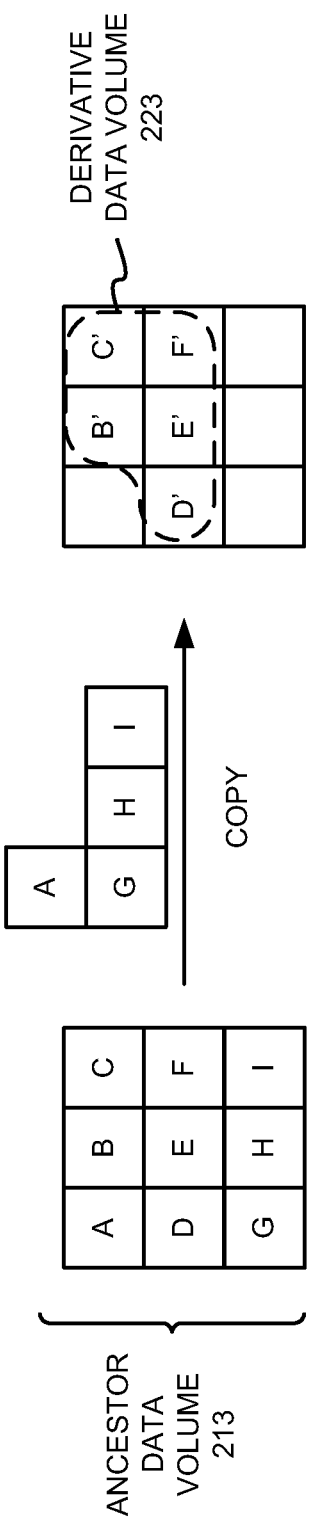

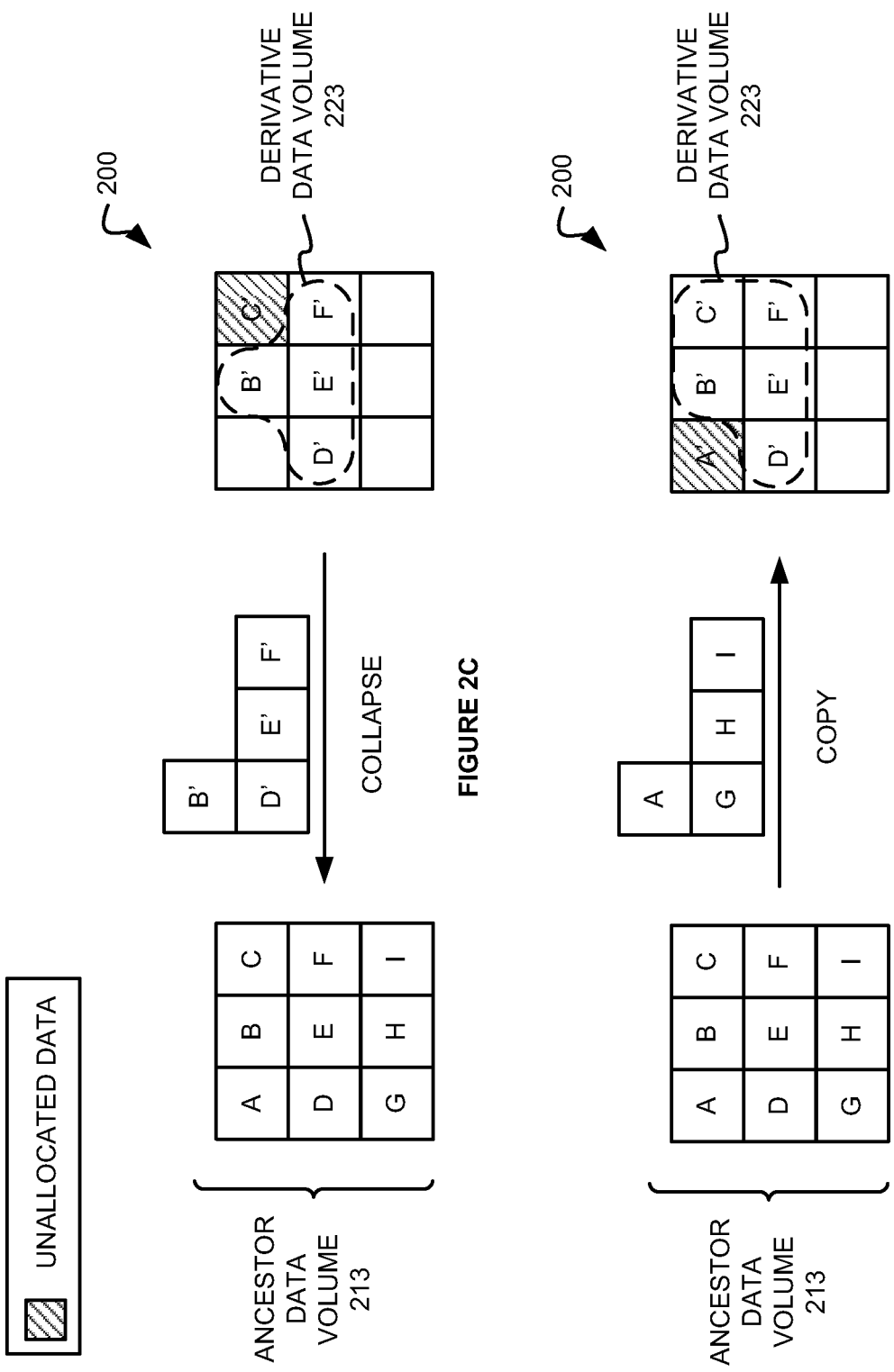

MERGING DATA VOLUMES AND DERIVATIVE VERSIONS OF THE DATA VOLUMES

RELATED APPLICATIONS

This patent application is related to and claims priority to U.S. Provisional Patent Application No. 61/390,184, filed on Oct. 6, 2010, and which is hereby incorporated by reference in its entirety.

TECHNICAL BACKGROUND

In the field of computer hardware and software technology, the use and deployment of virtual machines has become increasingly common. Virtual machines can generally be considered software implementations of physical computing systems. Data within a specialized data volume is processed by the hypervisors to instantiate a virtual machines. The virtual machines can then run their own operating systems, applications files, and the like. From the perspective of those applications, the virtual machines appear as if they are real machines.

In many implementations, snapshots or derivative versions of the data volume may be accessed and modified. At times, snapshot or derivative version of the data volume may be created due to the access requests or modifications. However, at some point the snapshot needs to be collapsed back into the original data volume. Unfortunately, the input/output operations related to collapsing snapshots can be high cost from a performance perspective, reducing the efficiency and benefits of virtual machine environments.

OVERVIEW

This overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter Disclosed are systems, methods, and software for merging an ancestor data volume and a derivative version of the ancestor data volume. In an embodiment, a method of collapsing derivative versions of ancestor data volumes comprises, responsive to an instruction to collapse a derivative version of an ancestor data volume into the ancestor data volume, determining if a characteristic of the derivative version of the ancestor data volume satisfies a criteria relative to a characteristic of the ancestor data volume. If the characteristic of the derivative version satisfies the criteria, merging the ancestor data volume into the derivative version of the underlying data to form an updated derivative version and establishing the updated derivative version as the ancestor data volume.

In an embodiment, a computer readable medium has stored therein program instructions executable by a computer system for collapsing derivative versions of ancestor data volumes, that when executed by the computer system, direct the computer system to, responsive to an instruction to collapse a derivative version of an ancestor data volume into the ancestor data volume, determine if a characteristic of the derivative version of the ancestor data volume satisfies a criteria relative to a characteristic of the ancestor data volume, and if the characteristic of the derivative version satisfies the criteria, merge the ancestor data volume into the derivative version of the underlying data to form an updated derivative version and establish the updated derivative version as the ancestor data volume.

In an embodiment, a data control system for collapsing derivative versions of ancestor data volumes comprises a processing system and a non-transitory storage system. The processing system is configured to execute program instructions directing the processing system to, responsive to an instruction to collapse a derivative version of an ancestor data volume into the ancestor data volume, determine if a characteristic of the derivative version of the ancestor data volume satisfies a criteria relative to a characteristic of the ancestor data volume, and if the characteristic of the derivative version satisfies the criteria, merge the ancestor data volume into the derivative version of the underlying data to form an updated derivative version and establish the updated derivative version as the ancestor data volume. The non-transitory storage system has the program instructions stored thereon.

In an embodiment, the derivative version corresponds to only a first portion of the ancestor data volume and the criteria comprises whether or not a size of the derivative version is greater than a size of a remaining portion of the ancestor data volume that does not include the first portion of the ancestor data volume.

In an embodiment, the size of the derivative version of the ancestor data volume does not include unallocated portions of the derivative version of the ancestor data volume.

In an embodiment, merging the ancestor data volume into the derivative version to form the updated derivate version comprises copying only portions of the ancestor data volume not yet represented in the derivative version into the derivative version.

In an embodiment, merging the ancestor data volume into the derivative version of the underlying data to form the updated derivative version and establishing the new derivative version as the ancestor data volume comprises altering meta data from pointing to portions of a underlying data volume as containing the ancestor data volume to pointing to a subset of the portions of the underlying data volume and additional portions of the underlying data volume as containing the derivative version.

In an embodiment, the ancestor data volume comprises a virtual disk file having a virtual machine stored therein.

In an embodiment, the derivative version of the ancestor data volume comprises a snapshot of the virtual disk file.

In an embodiment, if the derivative version does not satisfy the criteria, the derivative version is merged into the ancestor data volume.

BRIEF DESCRIPTION OF THE DRAWINGS

Many aspects of the disclosure can be better understood with reference to the following drawings. While several embodiments are described in connection with these drawings, the disclosure is not limited to the embodiments disclosed herein. On the contrary, the intent is to cover all alternatives, modifications, and equivalents.

FIGS. 2A-2D illustrate operation of a data control system in a data environment according to an embodiment.

TECHNICAL DISCLOSURE

Figure 1:
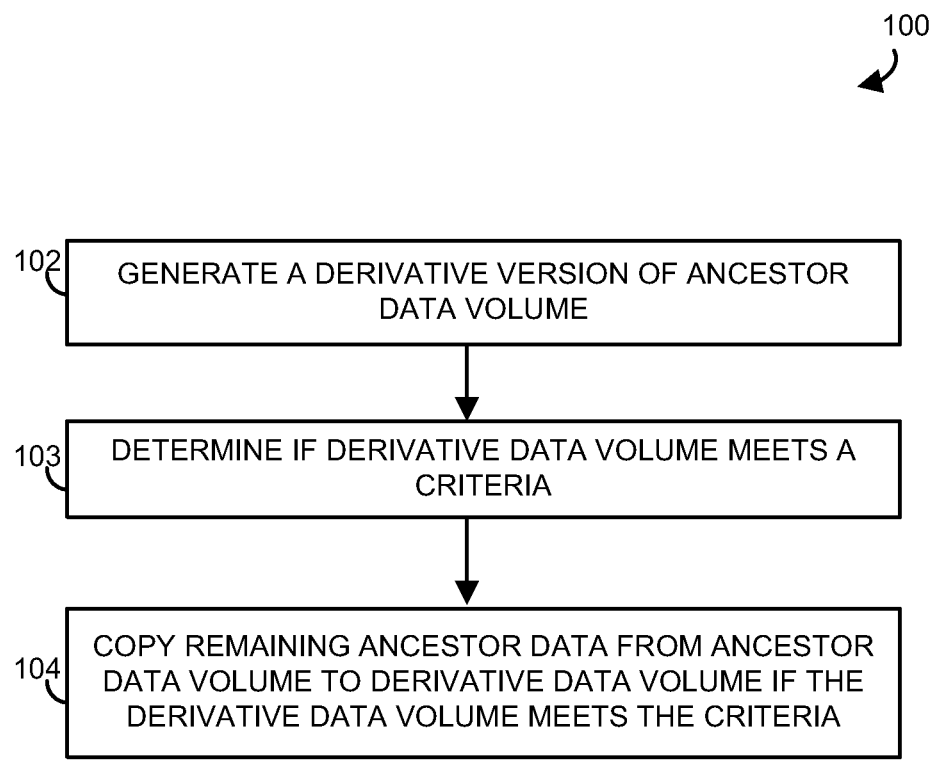
FIG. 1 illustrates the operation of a data control system according to an embodiment.

The following Technical Disclosure and associated figures teach the best mode of the invention. For the purpose of teaching inventive principles, some conventional aspects of the best mode may be simplified or omitted. The claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In virtual machine environments, accessing the contents of an underlying storage volume can be very resource intensive, reducing the performance of a virtual machine and other operations within a virtual machine environment. Moreover, some virtual machine environments use an optimization strategy known as copy-on-write. Copy-on-write allows multiple processes to request access to the same resource. Once one of the processes attempts to modify the resource, a derivative version of the resource is created.

Over time the derivative version of the resource grows as the process modifies the underlying blocks. Further complicating matters, those skilled in the art will appreciate that derivative versions of a resource may themselves have derivative versions creating a chain of derivatives. Typically, the derivative version(s) of the resource must be collapsed or merged back into the resource. This process can be very resource intensive.

Advantageously, the I/O cost of merging an ancestor data volume and a derivative version of the ancestor data volume can be optimized by minimizing or reducing the transferred data. For example, when the derivative version meets some criteria, blocks can be copied from the resource to the derivative version of the resource and the derivative version of the resource can become the resource. In some embodiments, the criteria can be set to a value to minimize the number of blocks that need to be transferred.

For example, if the number of blocks that need to be copied from the derivative version of the resource back into the resource exceeds the number of blocks that need to be collapsed back into the resource, then the system may copy blocks from resource to the derivative version of the resource.

Furthermore, in some embodiments the resource and the derivative version of the resource may be stored on one or more underlying storage volumes. The storage volume(s) may include meta data which provides information about blocks of data comprising the resource and blocks of data comprising the derivative version of the resource. The information in the meta data may include, for example, the location of the blocks of data on the underlying storage volume(s).

As previously discussed, the derivative version of the resource must be merged (either copied or collapsed) back into the resource. Advantageously, the I/O cost of merging an ancestor data volume and a derivative version of the ancestor data volume can be optimized by altering meta data rather than moving (copying or collapsing) the blocks of data.

For example, the meta data indicating the location of the blocks of data comprising the derivative version of the resource may replace the corresponding meta data indicating the location of the blocks of data comprising the resource.

Similarly, in some embodiments, if criteria are met, then the meta data indicating the location of the blocks of data comprising the resource may replace the corresponding meta data indicating the location of the blocks of data comprising the derivative version of the resource.

Referring now to FIG. 1, illustrated is process 100 describing the operation of a data control system 400 (FIG. 4) for merging an ancestor data volume and a derivative version of the ancestor data volume according to an embodiment.

To begin, a volume of data is generated and stored on an ancestor data volume. Data control system 400 then generates a derivative version of the ancestor data volume (Step 102). Ancestor and derivative data volumes may be any storage volumes capable of storing a volume of data. In some examples, the data volume may be a v-disk file such as, for example, a .vmdk file and the derivative version of the ancestor data volume may be a snapshot of the v-disk file. Other examples of data volumes include, but are not limited to, mail data volumes, backup volumes, system volumes, and server volumes.

The derivative version of the ancestor volume may be generated as a result of or in response to a number of events. For example, data control system 400 may receive a request, instruction, or other indication from a process attempting to write to the ancestor data volume. Data control system 400 may generate the derivative version of the ancestor data volume in response to the request, instruction, and/or other indication.

As discussed, the derivative version of the ancestor data volume may grow over time. Those skilled in the art will appreciate that data may be copied from the ancestor data volume to the derivative data volume as the derivative data volume grows. Data control system 400 then determines if the derivative data volume meets a criteria (Step 103). Lastly, the data control system copies the remaining ancestor data from the ancestor data volume to the derivative data volume if the derivative data volume meets the criteria (Step 104).

The derivative volume then becomes the new ancestor volume and the original ancestor volume is removed. Those skilled in the art will appreciate that the original ancestor volume may not be actually removed, but may appear removed as the pointer is changed to the new ancestor volume.

FIGS. 2A-2D illustrate operation of data control system 400 (FIG. 4) in a data environment 200 according to an embodiment for merging an ancestor data volume and a derivative version of the ancestor data volume. As shown, data environment 200 includes ancestor data volume 213 and derivative data volume 223.

In this example, data control system 400 may merge ancestor data volume 213 and derivative data volume 223 by either collapsing derivative data volume 223 into ancestor data volume 213 or by copying derivative data volume 223 into ancestor data volume 213.

Data control system 400 decides whether to collapse or copy based on a criteria. In the following examples, data control system 400 attempts to minimize the number of blocks that need to be transferred. For example, if the size of derivative data volume 223 is greater than half the size of ancestor data volume 213, then blocks are copied from ancestor data volume 213 to derivative data volume 223. Alternatively, if the size of derivative data volume 223 is less than half the size of the ancestor data volume 213, then derivative data volume 223 is collapsed into ancestor data volume. In this way, data control system 400 can minimize the data needed to be transferred.

In another example, if the size of derivative data volume 223 is greater than the size of the remainder of the ancestor blocks (those ancestor blocks not copied to derivative data volume 223 as it grew), then the remainder of the ancestor blocks are copied from ancestor data volume 213 to derivative data volume 213. Alternatively, if the size of derivative data volume 223 is less than the size of the remainder of ancestor blocks, then derivative data volume 223 is collapsed into ancestor data volume 213 (the blocks comprising derivative data volume 223 are copied from derivative data volume 223 to ancestor data volume 213).

Those skilled in the art will appreciate that other criteria are also possible. For example, the criteria may be an amount of time. In this case, the criteria may be met if, for example, the amount of time is exceeded. Other examples of criteria may include, but are not limited to, an amount of data transferred, a speed of the network, or a number or type of process or processes accessing data. Those skilled in the art will appreciate that multiple criteria may also be used together in some embodiments.

Referring first to FIG. 2A, illustrated is an example whereby derivative data volume 223 is collapsed into ancestor data volume 213. In this example, ancestor data volume 213 comprises ancestor data blocks A, B, C, D, E, F, G, H, and I. Derivative data volume 223 comprises derivative data blocks B', D' and F' which correspond to ancestor blocks B, D, and F. In this case, the size of derivative data volume 223 is three blocks and the size of the ancestor data volume 213 is nine blocks. Thus, data control system 400 collapses derivative blocks B', D', and F' into ancestor data volume 213 because three blocks are less than half of nine blocks.

FIG. 2B illustrates an example whereby ancestor data volume 213 is copied into derivative data volume 223 and derivative data volume 223 becomes the new ancestor data volume. In this example, derivative data volume 223 is first generated and then grows. In this example, ancestor data volume 213 comprises ancestor data blocks A, B, C, D, E, F, G, H, and I. Derivative data volume 223 comprises derivative blocks B', C', D', E' and F'. In this case, the size of the derivative data volume 223 is five blocks and the size of ancestor data volume 213 is nine blocks. Thus, data control system 400 copies blocks A, G, H, and I to the derivative data volume 223 because five blocks are more than half of nine blocks.

Those skilled in the art will appreciate that, after the remaining ancestor blocks are copied, derivate data volume 223 then replaces ancestor data volume 213 (i.e., becomes the ancestor data volume).

FIGS. 2C-2D illustrate operation of data control system 400 in data environment 200 according to an embodiment for merging an ancestor data volume and a derivative version of the ancestor data volume wherein some of the blocks are unallocated (i.e., free blocks). The allocation status of blocks may be read from a volume meta data or bitmap (not shown) which may be located on an underlying storage volume (not shown). Advantageously, data control system 400 does not have to read the contents of unallocated blocks from the derivative data volume because they are not "live," and thus the I/O cost of merging an ancestor data volume and a derivative version of the ancestor data volume is improved.

FIG. 2C illustrates an example whereby derivative data volume 223 is collapsed into ancestor data volume 213. In this example, ancestor data volume 213 comprises ancestor data blocks A, B, C, D, E, F, G, H, and I. Derivative data volume 223 comprises derivative data blocks B', D', E' and F' which correspond to ancestor blocks B, D, E and F. In this case, the size of derivative data volume 223 is four blocks even through block C' exists. That is, block C' is shown shaded indicating that the block is unallocated or free data, and thus not to be included in the size of the derivative data volume 223. Those skilled in the art will appreciate that unallocated data may represent, for example, a temporary file.

The size of the ancestor data volume 213 is nine blocks. Thus, data control system 400 collapses derivative blocks B', D', E' and F' into ancestor data volume 213 because four blocks are less than half of nine blocks.

FIG. 2D illustrates an example whereby ancestor data volume 213 is copied into derivative data volume 223 and derivative data volume 223 becomes the new ancestor data volume. In this example, derivative data volume 223 is first generated and then grows. In this example, ancestor data volume 213 comprises ancestor data blocks A, B, C, D, E, F, G, H, and I. Derivative data volume 223 comprises derivative blocks B', C', D', E' and F'. In this case, the size of the derivative data volume 223 is five blocks even through block A' exists. That is, block A' is shown shaded indicating that the block is unallocated or free data, and thus to be included in the size of the derivative data volume 223. Those skilled in the art will appreciate that unallocated data may represent, for example, a temporary file.

The size of ancestor data volume 213 is nine blocks. Thus, data control system 400 copies blocks A, G, H, and I to the derivative data volume 223 because five blocks are more than half of nine blocks. Those skilled in the art will appreciated that, after the remaining ancestor blocks are copied, derivate data volume 223 then replaces ancestor data volume 213 (i.e., becomes the ancestor data volume).

Figures 3A, 3B:
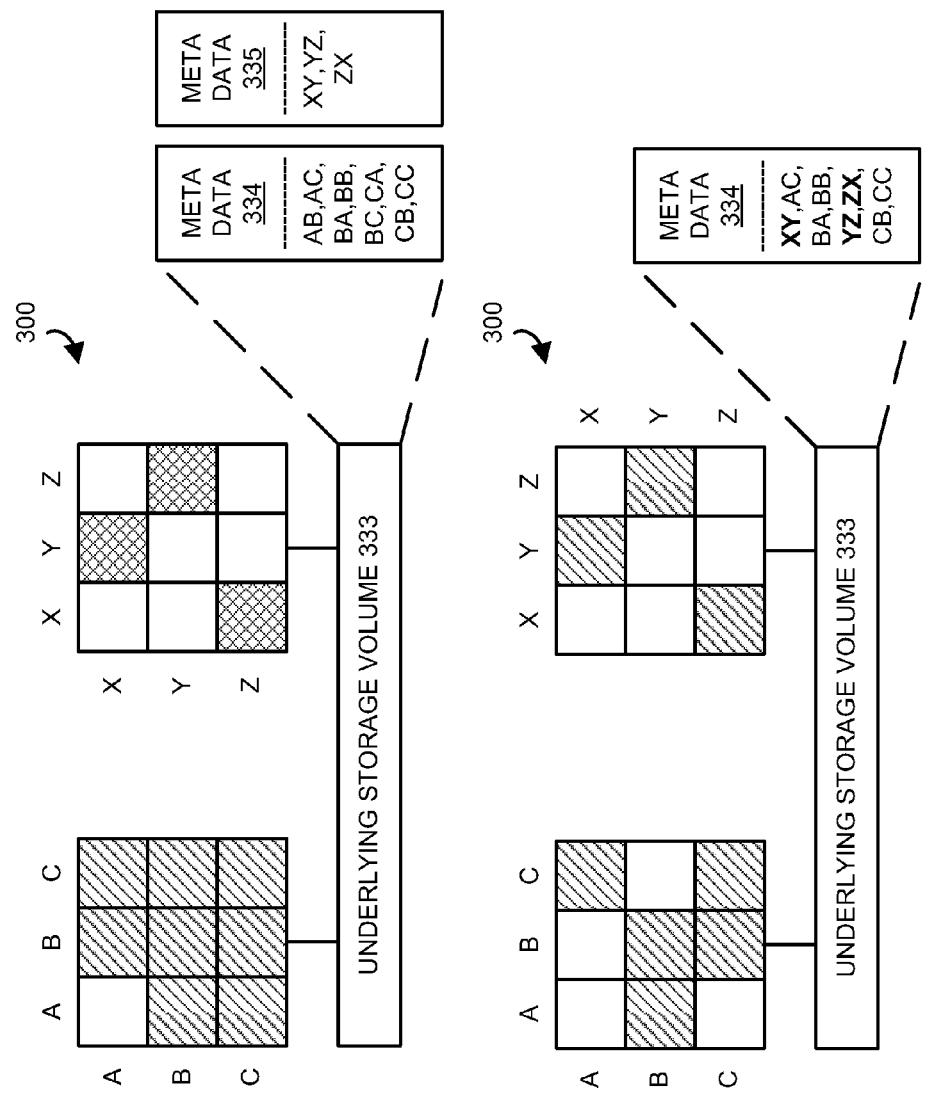
FIGS. 3A-3B illustrate a sequence of operations of a data control system in a data environment according to an embodiment.

FIGS. 3A-3B illustrate a sequence of operations of data control system 400 in data environment 300 according to an embodiment. Data environment 300 includes underlying storage volume 333, meta data 334, and meta data 335. Underlying storage volume includes an ancestor data volume 313 and a derivative data volume 323. In this example, the ancestor data volume 313 comprises ancestor blocks that are shown shaded. Derivative data volume 323 comprises derivative blocks that are shown with cross-hatching. As shown, both ancestor data volume 313 and derivative data volume 323 are stored on underlying storage volume 333. Those skilled in the art will appreciate that these data volumes may be stored on separate underlying storage volumes.

In this case, meta data 334 provides information about one or more pieces of the ancestor data volume 313 and meta data 335 information about one or more pieces of derivative data volume 323. For example, the meta data 334 and meta data 335 may provide the location of data in the data volumes on the underlying storage volume 333.

FIG. 3A illustrates meta data 334 pointing to the location of ancestor blocks of data AB, AC, BA, BB, BC, CA, CB, and CC. Similarly, meta data 335 points to the location of derivative blocks XY, YZ, and ZX. The blocks may represent blocks of data on the data volumes. Typically, as discussed above, when merging an ancestor data volume and a derivative data volume a number of data blocks need to be copied or moved. Advantageously, in some cases, the I/O cost of merging an ancestor data volume and a derivative version of the ancestor data volume can be optimized by altering meta data.

For example, FIG. 3B illustrates control system 400 altering meta data 334, rather than collapsing derivative data volume 323 into ancestor data volume 313 in order to merge ancestor data volume 313 and derivate data volume 323. In particular, rather than copying blocks XY, YZ, and ZX from derivate data volume 323 to ancestor data volume 313, the meta data is altered to point to a different location. In this case, meta data 334 for ancestor data volume 313 is altered to point to data blocks previously part of derivate data volume 323.

Figure 4:
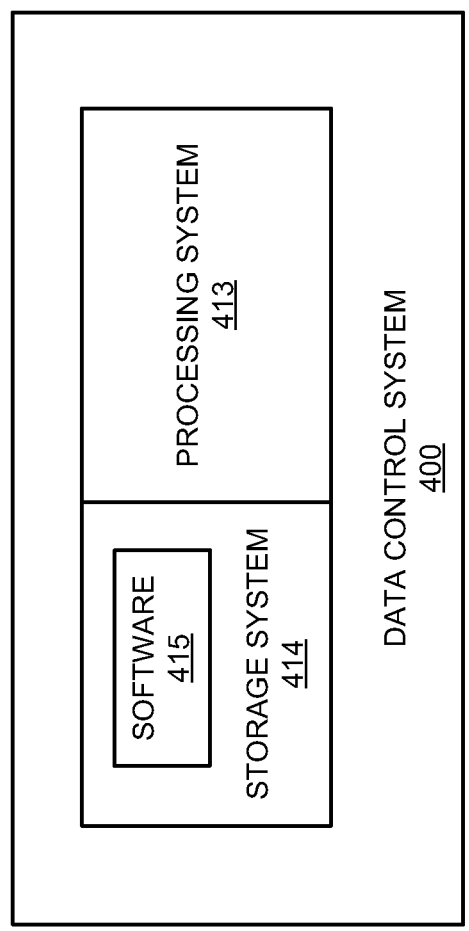
FIG. 4 illustrates a data control system according to an embodiment.

FIG. 4 illustrates data control system 400 according to an embodiment. Data control system 400 includes processing system 413 and storage system 414.

Processing system 315 is linked to storage system 414 and may also be linked to communication interface and a user interface. Processing system 413 includes processing circuitry. Storage system 414 includes software 415. Data control system 400 may include other well-known components such as a power system and enclosure that are not shown for clarity.

Processing system 413 may comprise a microprocessor and other circuitry that retrieves and executes software 415 from storage system 414. Processing system 413 may be implemented within a single processing device but may also be distributed across multiple processing devices or sub-systems that cooperate in executing program instructions. Examples of processing system 413 include general purpose central processing units and application specific processors, as well as any other type of processing device.

Storage system 414 may comprise a storage media readable by processing system 413 and capable of storing program instructions. Storage system 414 may include volatile and nonvolatile, removable and non-removable media implemented in any method or technology for storage of information, such as computer readable instructions, data structures, program modules, or other data. Storage system 414 may be implemented as a single storage device but may also be implemented across multiple storage devices or sub-systems. Storage system 414 may comprise additional elements, such as a controller, capable of communicating with processing system 413.

Examples of storage media include random access memory, read only memory, magnetic disks, optical disks, and flash memory, as well as any combination or variation thereof, or any other type of storage media. In some embodiments, the storage media may be a non-transitory storage media. It should be understood that in no case is the storage media a propagated signal.

Software 415 comprises computer programs, firmware, or some other form of machine-readable processing instructions. Software 415 may include an operating system, utilities, drivers, network interfaces, applications, or some other type of software. When executed by processing system 413, software 415 directs processing system 413 to operate data control system 400 as described herein.

In general, software 514 may, when loaded into processing system 413 and executed, transform processing system 413, and data control system 400 generally, from a general-purpose computing system into a special-purpose computing system customized to merge ancestor volumes into derivative versions of the volumes.

Processing system 413 may be constructed from any number of transistors or other discrete circuit elements, which may individually or collectively assume any number of states. Processing system 413 may operate as a finite-state machine in response to executable instructions contained within software 415. These computer-executable instructions may transform processing system 413 by specifying how processing system 413 transitions between states, thereby transforming the transistors or other discrete hardware elements therein.

Software 415 may also transform the physical structure of storage system 414. The specific transformation of the physical structure may depend on various factors in different implementations of this description. Examples of such factors may include, but are not limited to: the technology used to implement the storage media of storage system 414, whether the computer-storage media are characterized as primary or secondary storage, and the like.

For example, if the computer-storage media are implemented as semiconductor-based memory, software 415 may transform the physical state of the semiconductor memory when the software is encoded therein. For example, software 415 may transform the state of transistors, capacitors, or other discrete circuit elements constituting the semiconductor memory.

A similar transformation may occur with respect to magnetic or optical media. Other transformations of physical media are possible without departing from the scope of the present description, with the foregoing examples provided only to facilitate this discussion.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of collapsing derivative versions of ancestor data volumes, the method comprising:
responsive to an instruction to collapse a derivative version of an ancestor data volume into the ancestor data volume, determining if a characteristic of the derivative version of the ancestor data volume satisfies a criteria relative to a characteristic of the ancestor data volume; and,
if the characteristic of the derivative version satisfies the criteria, merging the ancestor data volume into the derivative version of the ancestor data volume to form an updated derivative version and establishing the updated derivative version as the ancestor data volume.

2. The method of claim 1 wherein the derivative version corresponds to only a first portion of the ancestor data volume, and wherein the criteria comprises whether or not a size of the derivative version is greater than a size of a remaining portion of the ancestor data volume that does not include the first portion of the ancestor data volume.

3. The method of claim 2 wherein the size of the derivative version of the ancestor data volume does not include unallocated portions of the derivative version of the ancestor data volume.

4. The method of claim 1 wherein merging the ancestor data volume into the derivative version to form the updated derivate version comprises copying only portions of the ancestor data volume not yet represented in the derivative version into the derivative version.

5. The method of claim 1 wherein merging the ancestor data volume into the derivative version of the ancestor data volume to form the updated derivative version and establishing the updated derivative version as the ancestor data volume comprises altering meta data from pointing to portions of an underlying data volume as containing the ancestor data volume to pointing to a subset of the portions of the underlying data volume and additional portions of the underlying data volume as containing the derivative version.

6. The method of claim 1 wherein the ancestor data volume comprises a virtual disk file having a virtual machine stored therein.

7. The method of claim 6 wherein the derivative version of the ancestor data volume comprises a snapshot of the virtual disk file.

8. The method of claim 1 further comprising, if the derivative version does not satisfy the criteria, merging the derivative version into the ancestor data volume.

9. A non-transitory computer readable medium having stored therein program instructions executable by a computer system for collapsing derivative versions of ancestor data volumes, that when executed by the computer system, direct the computer system to:
  responsive to an instruction to collapse a derivative version of an ancestor data volume into the ancestor data volume, determine if a characteristic of the derivative version of the ancestor data volume satisfies a criteria relative to a characteristic of the ancestor data volume; and,
  if the characteristic of the derivative version satisfies the criteria, merge the ancestor data volume into the derivative version of the ancestor data volume to form an updated derivative version and establish the updated derivative version as the ancestor data volume.

10. The computer readable medium of claim 9 wherein the derivative version corresponds to only a first portion of the ancestor data volume, and wherein the criteria comprises whether or not a size of the derivative version is greater than a size of a remaining portion of the ancestor data volume that does not include the first portion of the ancestor data volume.

11. The computer readable medium of claim 10 wherein the size of the derivative version of the ancestor data volume does not include unallocated portions of the derivative version of the ancestor data volume.

12. The computer readable medium of claim 9 wherein, to merge the ancestor data volume into the derivative version to form the updated derivate version, the program instructions, when executed by the computer system, direct the computer system to copy only portions of the ancestor data volume not yet represented in the derivative version into the derivative version.

13. The computer readable medium of claim 9 wherein, to merge the ancestor data volume into the derivative version to form the updated derivate version and establish the updated derivative version as the ancestor data volume, the program instructions, when executed by the computer system, direct the computer system to alter meta data from pointing to portions of an underlying data volume as containing the ancestor data volume to pointing to a subset of the portions of the underlying data volume and additional portions of the underlying data volume as containing the derivative version.

14. The computer readable medium of claim 9 wherein the ancestor data volume comprises a virtual disk file having a virtual machine stored therein.

15. The computer readable medium of claim 14 wherein the derivative version of the ancestor data volume comprises a snapshot of the virtual disk file.

16. The computer readable medium of claim 9 wherein the program instructions, when executed by the computer system, further direct the computer system to merge the derivative version into the ancestor data volume if the derivative version does not satisfy the criteria.

17. A data control system for collapsing derivative versions of ancestor data volumes comprising:
  a processing system configured to execute program instructions directing the processing system to, responsive to an instruction to collapse a derivative version of an ancestor data volume into the ancestor data volume, determine if a characteristic of the derivative version of the ancestor data volume satisfies a criteria relative to a characteristic of the ancestor data volume, and if the characteristic of the derivative version satisfies the criteria, merge the ancestor data volume into the derivative version of the ancestor data volume to form an updated derivative version and establish the updated derivative version as the ancestor data volume; and,
  a non-transitory storage system having the program instructions stored thereon.

18. The data control system of claim 17 wherein the derivative version corresponds to only a first portion of the ancestor data volume, and wherein the criteria comprises whether or not a size of the derivative version is greater than a size of a remaining portion of the ancestor data volume that does not include the first portion of the ancestor data volume, and wherein the size of the derivative version of the ancestor data volume does not include unallocated portions of the derivative version of the ancestor data volume.

19. The data control system of claim 17 wherein the ancestor data volume comprises a virtual disk file having a virtual machine stored therein, and wherein the derivative version of the ancestor data volume comprises a snapshot of the virtual disk file.

20. The data control system of claim 17 wherein the program instructions, when executed by the computer system, further direct the computer system to merge the derivative version into the ancestor data volume if the derivative version does not satisfy the criteria.

* * * * *